United States Patent
Cho et al.

(10) Patent No.: US 8,195,255 B2
(45) Date of Patent: Jun. 5, 2012

(54) SLIDING-TYPE PORTABLE TERMINAL

(75) Inventors: Sung-Chul Cho, Seoul (KR); Soo-Ik Jung, Seoul (KR); Myoung-Hoon Park, Goyang-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 944 days.

(21) Appl. No.: 12/114,522

(22) Filed: May 2, 2008

(65) Prior Publication Data

US 2008/0274776 A1 Nov. 6, 2008

(30) Foreign Application Priority Data

May 2, 2007 (KR) .................. 10-2007-0042637
Jun. 25, 2007 (KR) .................. 10-2007-0062358

(51) Int. Cl.
*H04B 1/38* (2006.01)
(52) U.S. Cl. ............... 455/575.4; 455/575.1; 455/575.3; 455/347
(58) Field of Classification Search .............. 455/575.1, 455/575.3, 575.4, 347
See application file for complete search history.

(56) References Cited

U.S. PATENT DOCUMENTS

| 7,529,081 B2* | 5/2009 | Harmon et al. | 361/679.3 |
| 7,610,069 B2* | 10/2009 | Kwak et al. | 455/575.4 |
| 2005/0043056 A1* | 2/2005 | Boesen | 455/550.1 |
| 2005/0119023 A1* | 6/2005 | Sudo et al. | 455/550.1 |
| 2006/0258302 A1* | 11/2006 | Ding et al. | 455/90.3 |

FOREIGN PATENT DOCUMENTS

KR 10-2006-0043065 A 5/2006

* cited by examiner

*Primary Examiner* — Tuan Pham
(74) *Attorney, Agent, or Firm* — Jefferson IP Law, LLP

(57) ABSTRACT

A sliding-type portable terminal is provided. The sliding-type portable terminal includes a first housing and a second housing. The second housing faces the first housing and can slide relative to the first housing. The sliding-type portable terminal also includes a pair of link members coupled with the first housing and the second housing. The link members rotate relative to one of the first and second housings. Also provided is a first guide opening formed on the other housing wherein one end of the link members is engaged with the first guide opening so as to move along the first guide opening as the second housing slides. In the sliding-type portable terminal, a pair of housings can be rotatably coupled with each other by means of the link members so as to sufficiently secure a greater range of sliding, and thus a space for mounting an input device, such as a keypad, or the like, is increased.

23 Claims, 11 Drawing Sheets

SLIDING-TYPE PORTABLE TERMINAL

PRIORITY

This application claims the benefit under 35 U.S.C. §119 (a) of a Utility Model Application and a Patent Application which were filed in the Korean Industrial Property Office on May 2, 2007 and assigned Serial No. 10-2007-0042637 and on Jun. 25, 2007 and assigned Serial No. 10-2007-0062358, respectively, the entire disclosures of both of which are hereby incorporated by reference.

BACKGROUND OF THE INVENTION

1. Field of the Invention

The present invention relates to a portable terminal. More particularly, the present invention relates to a sliding-type portable terminal, in which a pair of housings is coupled with each other in such a manner that they can linearly move while facing each other.

2. Description of the Related Art

In general, the term "portable terminal" refers to a device that provides a user with a mobile communication function. With the advancement of technology, portable terminals now include complex functions so as to be used as a multimedia device for playing a music file, a moving picture file, and the like and for use as a financial service device for making a micro payment, mobile banking, and the like, in addition to a simple mobile communication device.

Portable terminals may be classified into bar-type terminals, flip-type terminals and folder-type terminals according to their appearance. Recently, sliding-type terminals have also been released. The sliding-type terminals occupy a dominant position in the portable terminal market, together with the folder-type terminals.

The bar-type portable terminal has a single body housing on which a keypad, an input unit such as a transmitter, a display unit, and an output unit such as a receiver, are mounted. Although every unit used for the mobile communication function is mounted on the single body housing so that the terminal is simple, there is a limitation in the miniaturization of the portable terminal because it is difficult to secure a distance between the transmitter and receiver.

The flip-type portable terminal has a flip cover rotatably assembled with a bar-type portable terminal so as to cover the keypad used as the input unit in the communication-standby mode. Such configuration prevents the inadvertent function of the keypad. However, there is also a limitation in the miniaturization of the flip-type portable terminal because it is difficult to secure a distance between the transmitter and the receiver.

The folder-type portable terminal includes a pair of body housings assembled so as to be folded. As a transmitter and a receiver are arranged on each of the pair of body housings, respectively, it is preferable to make the terminal compact and is easy to secure a sufficient distance between the transmitter and the receiver. Thus, the folder-type portable terminal has occupied a dominant position in the portable terminal market for some time.

The sliding-type portable terminal has a pair of housings assembled to be slidable. In a sliding-type portable terminal, an input unit and an output unit are separately mounted on each of the pair of housings. More particularly, the keypad, which is an input unit, is opened/closed according to the sliding direction of the housings. Accordingly, an inadvertent function of the keypad is prevented in the standby state, it is convenient to use in the call state and it advantageously makes the terminal compact. Because of these advantages, the sliding-type portable terminal has gradually gained larger portions of the overall market of portable terminals so that now it occupies a more dominant position than that of the folder-type portable terminal.

However, in the sliding-type portable terminal, the sliding range is limited in order to secure a firm assembling structure. For example, in a sliding-type portable terminal having a total length of 90~100 mm in a state of a pair of housings being opened, the slidable range of one housing in a longitudinal direction is limited to approximately 35 mm. That is, when one housing of the terminal slides so as to open a part of the other housing, the two housings maintain a closed state of a minimum of 55 mm.

The above-described sliding-type portable terminal has a problem in that it is difficult to a secure a sufficient space for mounting the input unit, particularly the keypad. In order to solve the problem, a keypad for inputting a character/number and a keypad including functional keys such as a menu item key, a call key, or the like, are provided so that each is mounted on a different housing, respectively. However, that disadvantageously makes the space for mounting the display unit smaller.

SUMMARY OF THE INVENTION

An aspect of the present invention is to address the above-mentioned problems and/or disadvantages and to provide at least the advantages described below. Accordingly, an aspect of the present invention is to provide a sliding-type portable terminal in which a pair of housings can be assembled with each other in a stable manner so as to sufficiently secure a range of the sliding.

A further aspect of the present invention is to provide a sliding-type portable terminal in which the sliding range of the housings is sufficiently secured so that a space for mounting an input device, such as a keypad, or the like, expands.

Still a further aspect of the present invention is to provide a sliding-type portable terminal in which the sliding range of the housings is sufficiently secured and at the same time, a display device can be placed to be inclined, so that a user can conveniently enjoy a multimedia function such as watching a broadcast.

In accordance with an aspect of the present invention, a sliding-type portable terminal is provided. The sliding-type portable terminal includes a first housing, a second housing for sliding while facing the first housing, a pair of link members coupled with at least one of the first housing and the second housing so as to rotate and a first guide opening formed on another housing between the first housing and the second housing, wherein one end of the link members is engaged with the first guide opening so as to move along the first guide opening as the second housing slides.

BRIEF DESCRIPTION OF THE DRAWINGS

The above and other aspects, features and advantages of the certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
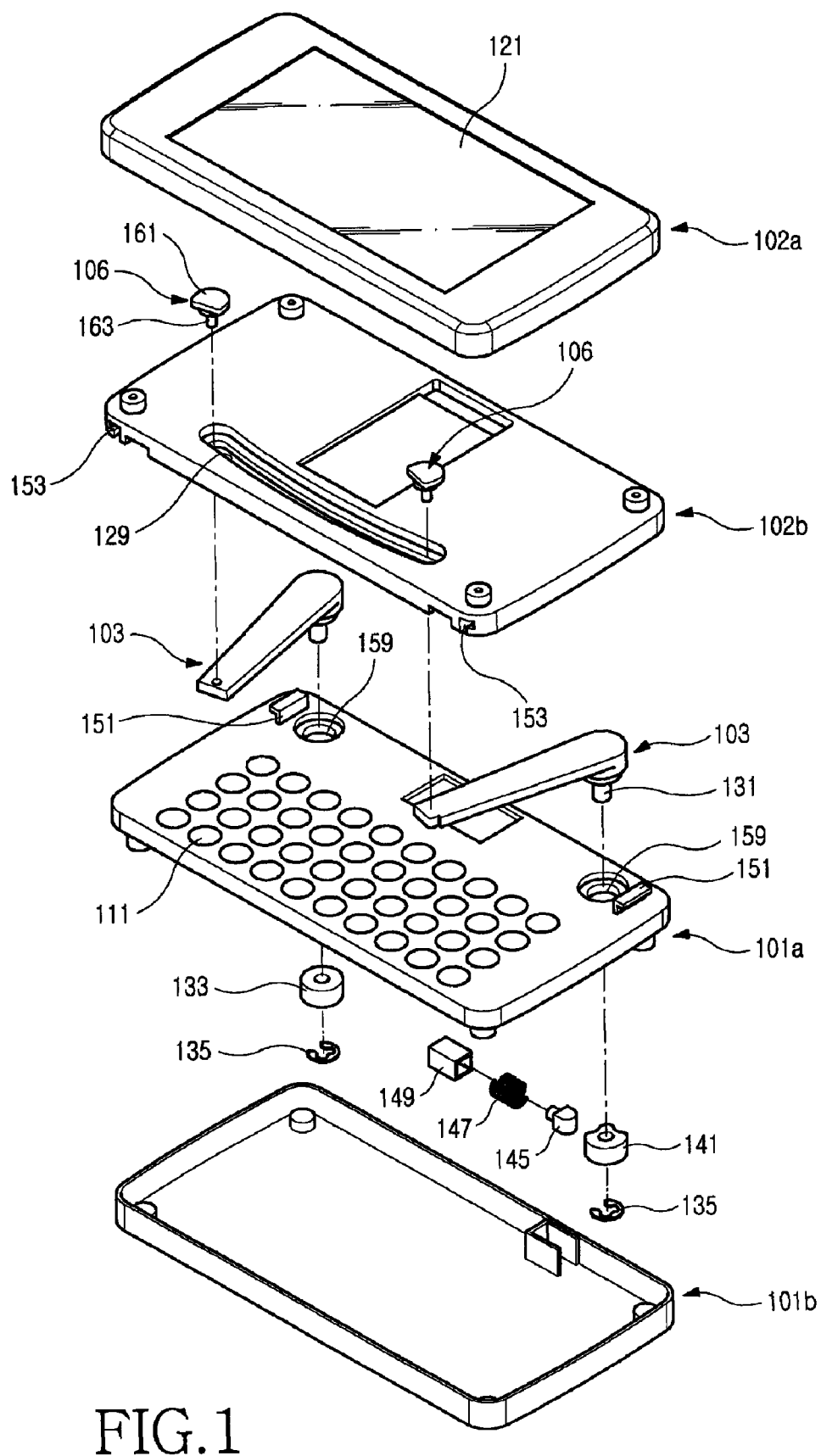
FIG. 1 is an exploded perspective view illustrating a sliding-type portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As illustrated in FIGS. 1 to 4, a sliding-type portable terminal 100 according to an exemplary embodiment of the present invention includes a first housing 101, a second housing 102, and a plurality of link members 103. The plurality of link members 103 enables the first housing 101 and the second housing 102 to be connected. The plurality of link members 103 also enables the second housing 102 to slide relative to the first housing 101. In an exemplary implementation, the first housing 101 includes a front cover 119b and 101a and a rear case 101b. Also in an exemplary implementation, the second housing 102 includes a front case 102a and a rear cover 119b and 102b. It should be noted that both the front cover of the first housing 101 and the rear cover of the second housing 102 include element 119b.

Hereinafter, for sake of convenience, the front cover 119b and 101a and the rear case 101b are called "the first housing 101" and the front case 102a and the rear cover 119b and 102b are called "the second housing 102".

In the first housing 101, the front cover 119b and 101a and the rear case 101b are assembled, a keypad 111 is mounted on one surface of or otherwise integrated with the first housing 101, and a pair of pivot openings 159 is formed on a position adjacent to or otherwise nearby the keypad 111. The pivot openings 159 are formed adjacent to or otherwise nearby both ends of the first housing 101, respectively, and the link members 103 are rotatably assembled with the first housing 101 through the pivot openings 159.

In the second housing 102, the front case 102a and the rear cover 119b and 102b are assembled. A display device 121 is mounted on or otherwise integrated with one surface of the second housing 102. The display device 121 always maintains an exposed state and employs a touch screen so as to be used for a simple communication function, such as inputting and calling a telephone number, or the like. The second housing 102 opens and closes the keypad 111 while sliding in a width-wise direction of the first housing 101. That is, the second housing 102 exposes or covers the keypad 111 when it slides in a width-wise direction relative to the first housing 101.

A first guide opening 129 is formed on the other surface of the second housing 102. In an exemplary implementation, the first guide opening 129 extends in a longitudinal direction of the second housing 102 and has a shape of a smooth curve. One end of each of the link members 103 is engaged with the first guide opening 129 so as to move along the first guide opening 129 when the second housing 102 slides.

When the second housing 102 completely closes the first housing 101, particularly the keypad 111, the one end of the link members 103 and the first guide opening 129 are positioned adjacent to one surface of the first housing 101. That is the one end of the link members 103 and the first guide opening 129 are positioned close to one edge of the first housing 101. Further, when the second housing 102 completely opens a part of the first housing 101, particularly the keypad 111, the one end of the link members 103 and the first guide opening 129 are positioned adjacent to the other surface of the first housing 101 in that they are close to another edge of the first housing 101. That is, the first guide opening 129 is positioned adjacent to or nearby the one surface or edge of the second housing 102. The second housing 102 slides on the first housing 101 within the range of the first guide opening 129 while the first guide opening is not being exposed. The link members 103 are connected to the second housing 102 through an engagement member 106 assembled with one end of the link member, and are rotatably assembled with the first housing 101 through a pivot pin 131 extending from one surface of the other end of the link member 103. The engagement member 106 includes a supporting part 161 positioned on the first guide opening 129 in an inner surface of the second housing 102, and a connecting part 163 extending from one surface of the supporting part 161 to the first guide opening 129. The connecting part 163 is assembled with the other surface of the one end of the link members 103, so that the ends of the link members 103 are engaged with the second housing 102, respectively.

The supporting part 161 is supported at a peripheral region of the first guide opening 129 in the inner surface of the second housing 102, and the link members 103 are positioned on an outer surface of the second housing 102 and assembled with the connecting part 163 so as to be engaged with the second housing 102. Further, one end of the link members 103 can move along the first guide opening 129 by means of the engagement member 106.

The pivot pin 131 extends from the one surface of the link members 103 to an inner surface of the first housing 101 through the pivot opening 159. A fastening member 135, such as an E-ring, or the like, is engaged with an end of the pivot pin 131 in the inner surface of the first housing 101. Therefore, the link members 103 can rotate without separating from the first housing 101.

The pivot pin 131 is assembled with a bushing 133 so as to stably rotate the link members 103. The bushing 133 is interposed between the fastening member 135 and the inner surface of the first housing 101 so that the fastening member 135 is prevented from being in direct contact with the inner surface of the first housing 101.

The bushing 133 can be assembled with every pivot pin 131. However, in the exemplary embodiment of the present invention, a driving means is mounted on one of the link members 103. The driving means provides a stop force for maintaining a hold state of the second housing 102 at a position where the keypad 111 of the first housing 101 is completely closed or opened. Further, while sliding the second housing 102, the driving means provides a driving force for moving the second housing 102 to a position where the keypad 111 is closed or opened.

The driving means includes a first cam member 141, a second cam member 145, and a spring 147. The driving means may also include a spring housing 149 in order to manufacture the second cam member 145 and the spring 147 into one module or simply in order to provide a cover for the spring.

The first cam member 141 is connected with the pivot pin 131 so as to be interposed between the fastening member 135 and the inner surface of the first housing 101, and is shaped similar to the bushing 133. However, the first cam member 141 is different from the bushing 133 because the first cam member 141 includes a pair of stopper grooves 143 on an outer surface thereof. Further, it would be acceptable if the bushing 133 were either fixed to the pivot pin 131 or rotatably assembled with the pivot pin 131. However, the bushing differs from the first cam member 141 in that the first cam member 141 is fixed to the pivot pin 131. Accordingly, if the link member 103 rotates, the first cam member 141 assembled with the pivot pin 131 rotates together with the pivot pin 131.

The second cam member 145 receives an elastic force relative to the first housing 101 so as to apply pressure to an outer surface of the first cam member 141. Therefore, if the second housing 102 slides, the first cam member 141 rotates together with the pivot pin 131, and the second cam member 145 applies pressure to the outer surface of the first cam member 141 so as to generate a friction force. At this time, because the stopper grooves 143 are formed on the outer surface of the first cam member 141, the second cam member 145 can be engaged with one of the stopper grooves 143 within the sliding range of the second housing 102.

If a spring housing is employed, one end of the spring 147 may be supported by the spring housing 149 mounted on the first housing 101, particularly in the inner surface of the first housing 101. The other end of the spring 147 is supported by the second cam member 145. The elastic force of the spring 147 is applied in a direction so that the second cam member 145 is engaged with the first cam member 141.

The spring housing 149 makes the second cam member 145 and the spring 147 into one module, in which the spring 147 is received in the spring housing 149 and then the second cam member 145 is received in the spring housing 149. The second cam member 145 receives the elastic force of the spring 147 so as to be exposed to one end of the spring housing 149.

In a state of being exposed from the spring housing 149, the second cam member 145 pressures the outer surface of the first cam member 141 by the elastic force of the spring 147 and is rubbed with the outer surface of the first cam member 141 during the sliding of the second housing 102.

Figure 2:
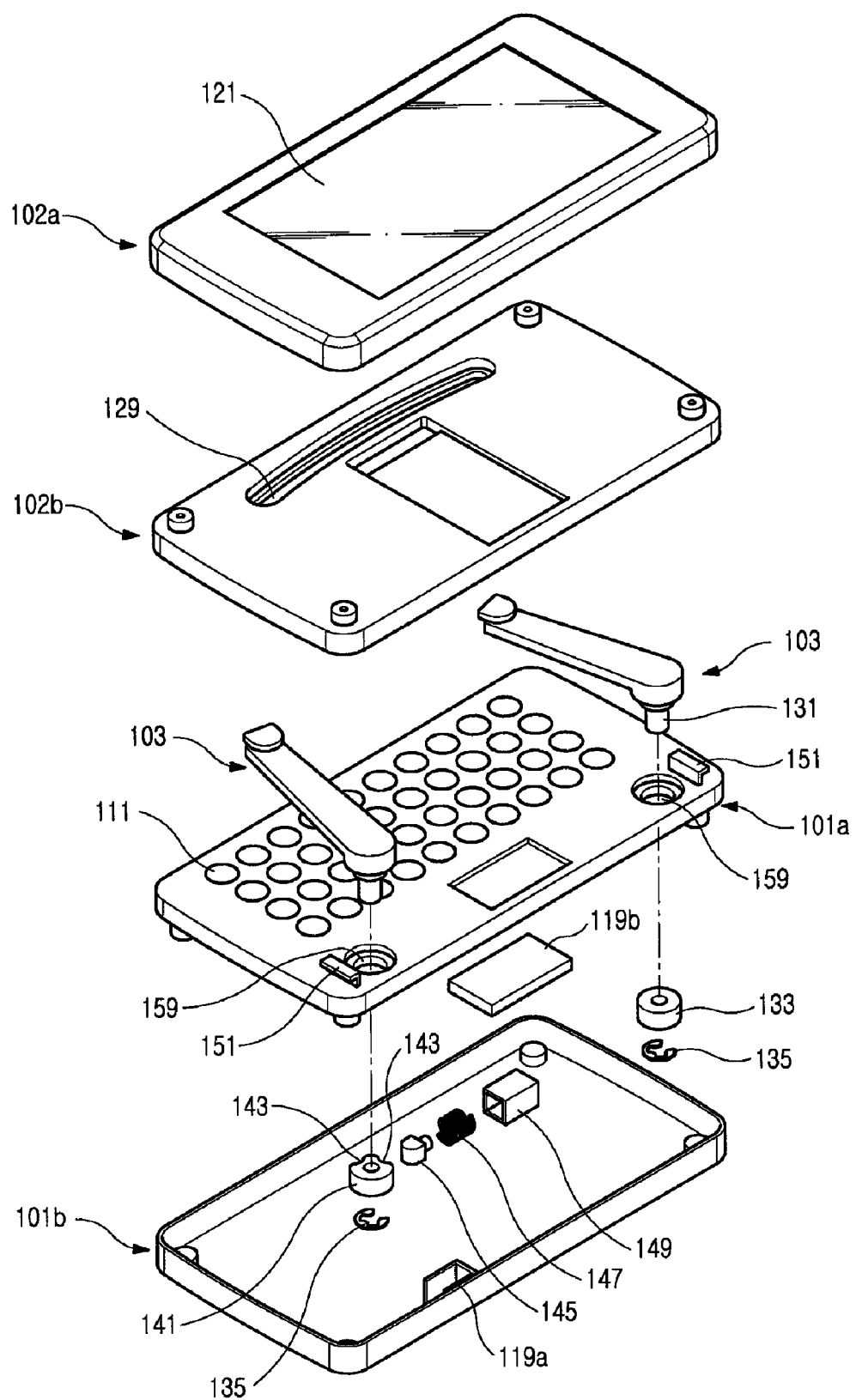
FIG. 2 is an exploded perspective view illustrating a sliding-type portable terminal according to an exemplary embodiment of the present invention.
Figure 3:
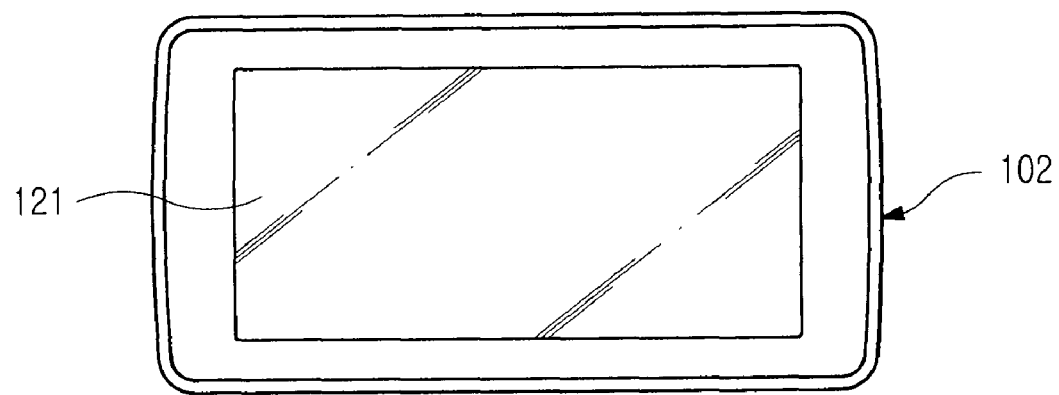
FIG. 3 is a plane view illustrating a sliding-type portable terminal according to an exemplary embodiment of the present invention.
Figure 4:
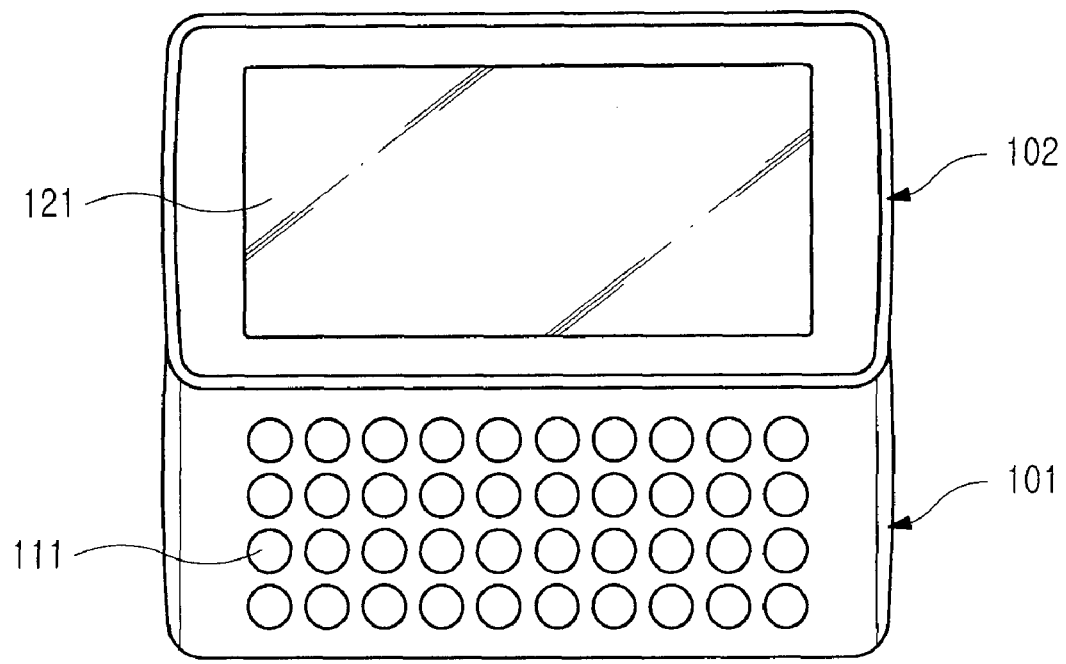
FIG. 4 is a plane view illustrating an opened state of a first housing according to an exemplary embodiment of the present invention.

In order to mount the spring housing 149, a support rib 119a is formed in the inner surface of the first housing 101. Referring to FIG. 2, a lower surface of the spring housing 149 faces the inner surface of the first housing 101, both side surfaces and one end thereof are surrounded by the support rib 119a, and an upper surface thereof faces a cover 119b assembled with the support rib 119a. The spring housing 149 is mounted inside of the first housing 101 while other surfaces thereof, except for the surface through which the second cam member 145 is exposed, are surrounded by the first housing 101, the support rib 119a and the cover 119b.

The first cam member 141 rotates in a direction in which one of the stopper grooves 143 is engaged with the second cam member 145 during the sliding of the second housing 102, so that the driving means provides the driving force for sliding the second housing 102. That will be described in more detail with reference to FIGS. 5 to 7.

In order to stably support the sliding of the second housing 102 while engaging the first housing 101 with the second housing 102, the terminal 100 includes a guide protrusion 151 formed on the first housing 101 and a second guide groove 153 formed on the second housing 102. In an exemplary embodiment of the present invention, it is illustrated that the guide protrusion 151 and the second guide groove 153 are formed on both ends of the first housing 101 and the second housing 102, respectively.

The guide protrusions 151 are formed adjacent to or otherwise nearby the pivot opening 159, and an end of each guide protrusion 151 is bent outwardly. The second guide grooves 153 extend in a direction of the movement of the second housing 102. One end of each of the second guide grooves 153 is opened on one side surface of the second housing 102 and the other end thereof is closed. Therefore, while FIG. 1 illustrates that the second guide grooves 153 are formed on the side surface of the second housing 102, the guide grooves 153 are not illustrated in FIG. 2 because the view of FIG. 2 includes the end of each of the guide grooves 153 that is closed.

Each of the guide protrusions 151 is engaged with one of the second guide grooves 153. With this arrangement, the second housing 102 slides while receiving the support of the guide protrusions 151 and the second guide grooves 153. Further, the ends of each of the guide protrusions 151 are bent outwardly, respectively, and each of the second guide grooves 153 is shaped like the guide protrusion 151, so that movement of the second housing 102 can be limited in any direction, except for the sliding direction of the second housing 102.

Each of the guide protrusions 151 is blocked by an inner wall of the closed end of the respective second guide groove 153 and the ends of the link members 103 are blocked by each other, so that the range of the sliding of the second housing 102 is limited. These configurations will be described in more detail with reference to FIGS. 5 to 7.

Figure 5:
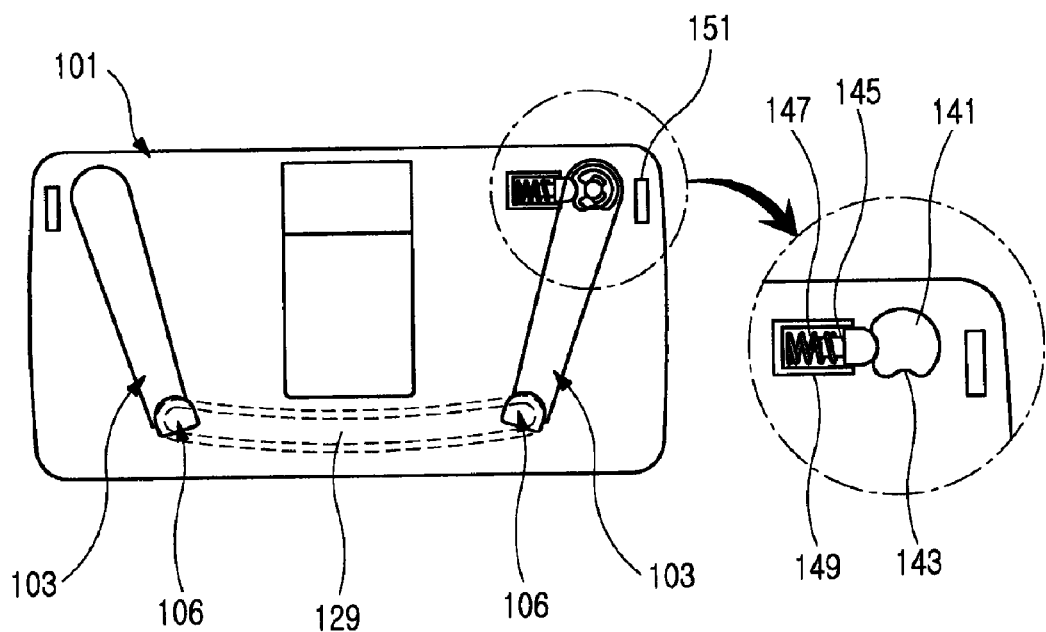
FIGS. 5, 6 and 7 are virtual views sequentially illustrating the opening of a first housing of a sliding-type portable terminal according to an exemplary embodiment of the present invention.
Figure 6:
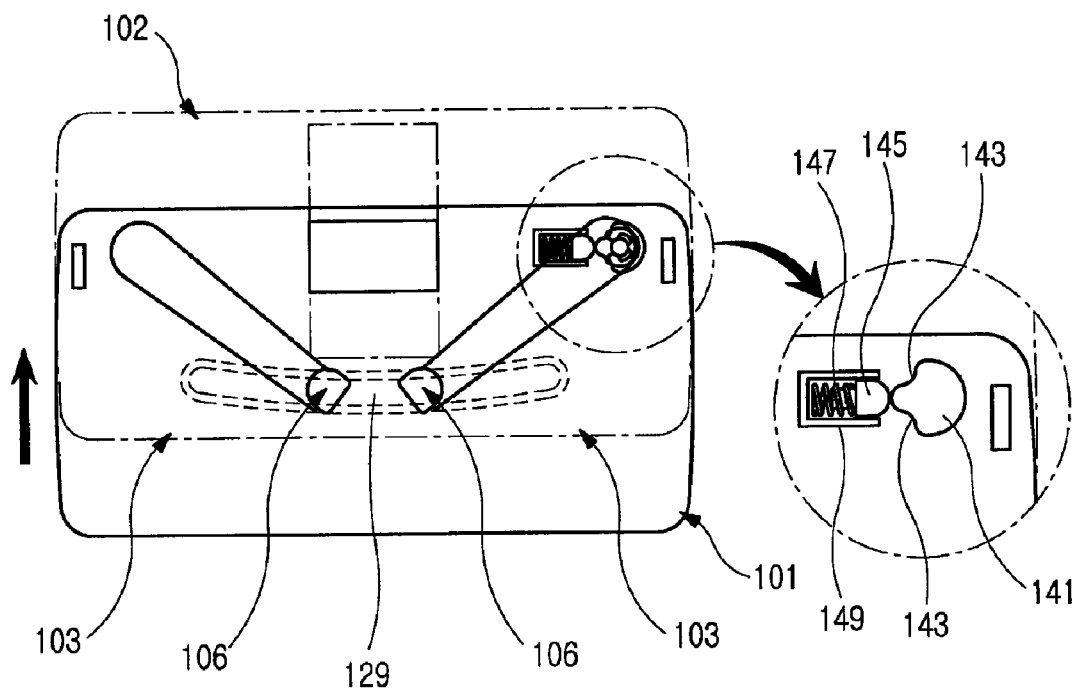
Figure 7:
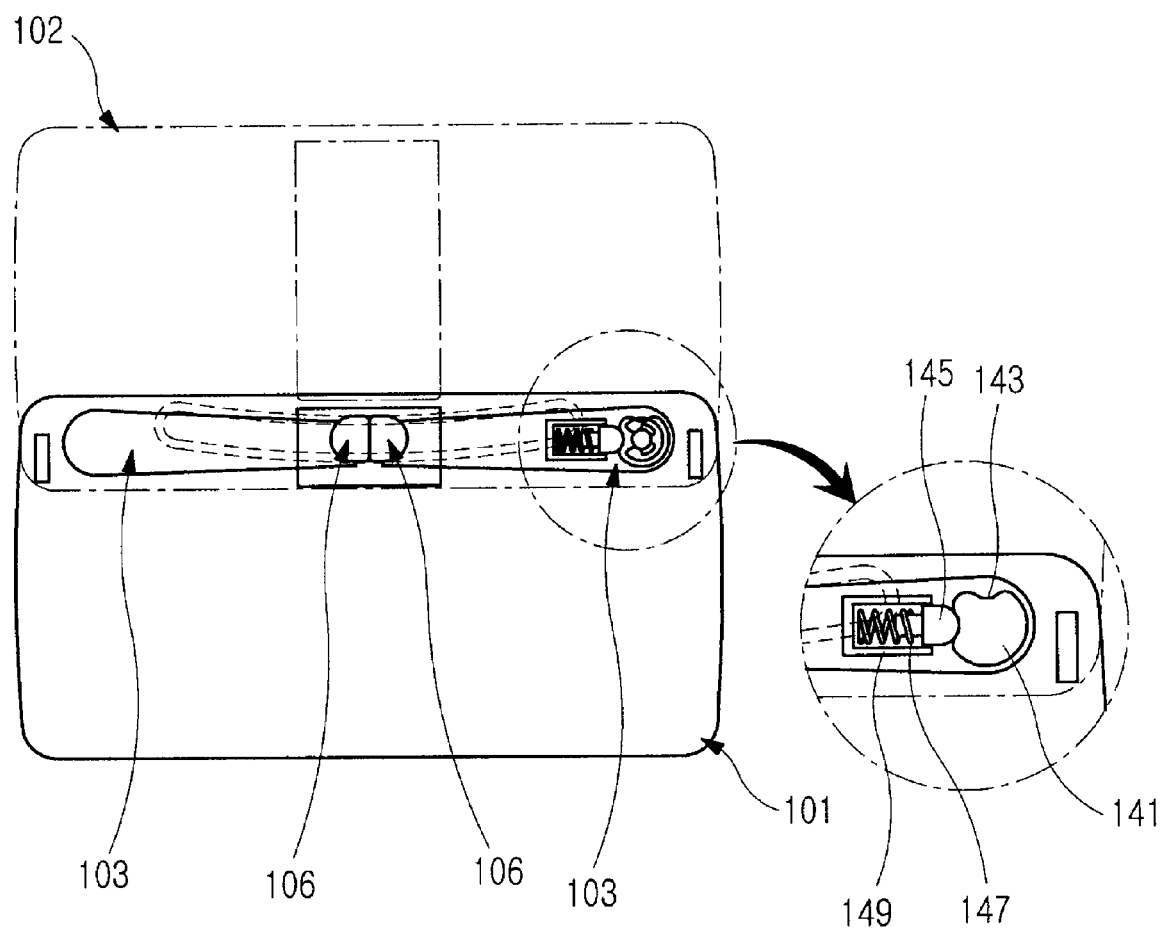

Hereinafter, an exemplary operation of opening the first housing 101 through sliding the second housing 102 will be described with reference to FIGS. 5 to 7. In FIGS. 5 to 7, in order to simplify the description of the operation of the link member 103, the configuration of the keypad 111, or the like, is not illustrated.

The second housing 102 receives the driving force generated by the driving means on the first housing 101 so as to slide in a width direction of the first housing 101 so that it opens and closes the keypad 111. Further, in a state of the keypad 111 being completely opened or closed, the second housing 102 can maintain its stopped state by the stopping force provided from the driving means.

Referring to FIG. 5, when the second housing 102 completely closes the first housing 101, particularly the keypad 111, the first guide opening 129 and the ends of the link members 103, are adjacent to the end of the first housing 101. At this time, the guide protrusion 151 is blocked by the inner wall of the closed end of the second guide groove 153 so that the second housing cannot move downwardly anymore, but only can move upwardly. Simultaneously, the second cam member 145 is engaged with one of the stopper grooves 143 by the elastic force of the spring 147 so that the second housing 102 can maintain the stable stop state.

When the keypad 111 is completely closed, in order for the second housing 102 to move toward the upper surface of the first housing 101, an external force capable of rotating the first cam member 141 and separating the second cam member 145 from the stopper groove 143 should be applied.

As shown in FIG. 6, if the user moves the second housing 102 to open or expose the keypad 111, an end of each of the link members 103 moves towards each other along the first guide opening 129 and the link members 103 rotate on the first housing 101. Therefore, the first cam member 141 also rotates together with the pivot pin 131.

If the first cam member 141 rotates, the second cam member 145 is gradually separated from the stopper groove 143 so as to be pushed into the inner surface of the spring housing 149. Even though the second cam member 145 is pushed into the inner surface of the spring housing 149, the second cam member 145 maintains a state of being in contact with the outer surface of the first cam member 141 by the elastic force of the spring 147. Therefore, the second cam member 145 tends to be engaged with the stopper groove 143 before the second cam member 145 is completely separated from the stopper groove 143, which applies as the driving force for rotating the first cam member 141.

As illustrated in FIG. 5, the driving means generates the driving force for moving the second housing 102 in a direction of closing the keypad 111 until the second cam member 145 is completely separated from the stopper groove 143.

Referring again to FIG. 6, if the second housing 102 slides and the second cam member 145 is completely separated from the stopper groove 143, the second cam member 145 is in contact with the outer surface of the first cam member 141 so as to not generate the driving force.

If the user further moves the second housing 102 so that the second cam member 145 starts to enter the other stopper groove 143, the second cam member 145 moves forward and rotates the first cam member 141 by the elastic force of the spring 147. At this time, the rotation of the first cam member 141 rotates the link member 103 so as to slide the second housing 102, thereby opening the keypad 111.

Finally, the driving means generates the driving force for rotating the link member 103 from the time when the second cam member 145 starts to enter any one of the stopper grooves 143. By the driving force of the driving means, the link members 103 rotate so as to slide the second housing 102.

Referring to FIG. 7, when the keypad 111 is completely opened, the first guide opening 129 and the end of the link members 103 are positioned adjacent to the other side surface of the first housing 101. Even though the keypad 111 is completely opened, neither the first guide opening 129 nor the link members 103 are exposed to the outside. At this time, the ends of the link members 103, particularly the engagement members 106, are blocked by each other so that the second housing 102 cannot move upwardly anymore. Also, the second cam member 145 is engaged with the other stopper groove 143, so as to stably maintain the stop state of the second housing 102.

The foregoing described an exemplary configuration wherein the second cam member 145 is engaged with the other stopper groove 143 when the keypad 111 is completely opened. However, if the second cam member 145 can maintain the state of not being completely engaged with the other stopper groove 143 when the keypad is completely opened, the link member 103 tends to upwardly move the second housing 102. At this time, the ends of the link members 103 are blocked by each other so that the second housing 102 cannot upwardly move anymore. Therefore, the driving force generated by the driving means is applied as the stop force for stably holding the second housing 102.

As described above, the guide protrusion 151 is blocked by the inner wall of the second guide groove 153 when the keypad 111 is completely closed, so that the second housing 102 cannot downwardly move anymore. Further, if the keypad 111 is completely opened, the ends of the link members 103 are blocked by each other so as not to rotate anymore. Therefore, the second housing 102 cannot move upwardly anymore. Accordingly, the movement range of the second housing 102 is limited by the guide protrusion 151, the second guide groove 153, and the link members 103.

As described above, by connecting the first housing 101 and the second housing 102 by means of the link members 103, the second housing 102 can open and close the greatest portion of the one surface of the first housing 101. Therefore, the space for mounting the input unit expands so that it provides the condition where various input units, such as a functional keypad 111, a keypad arranged in a QWERTY key array 111, or the like, can be mounted on the first housing 101, and the display device 121 can be mounted on the second housing 102.

Further, the sliding of the second housing 102 is supported by means of the guide protrusion 151 and the second guide groove 153, in addition to the link members 103, so that the second housing 102 can stably slide.

Figure 8:
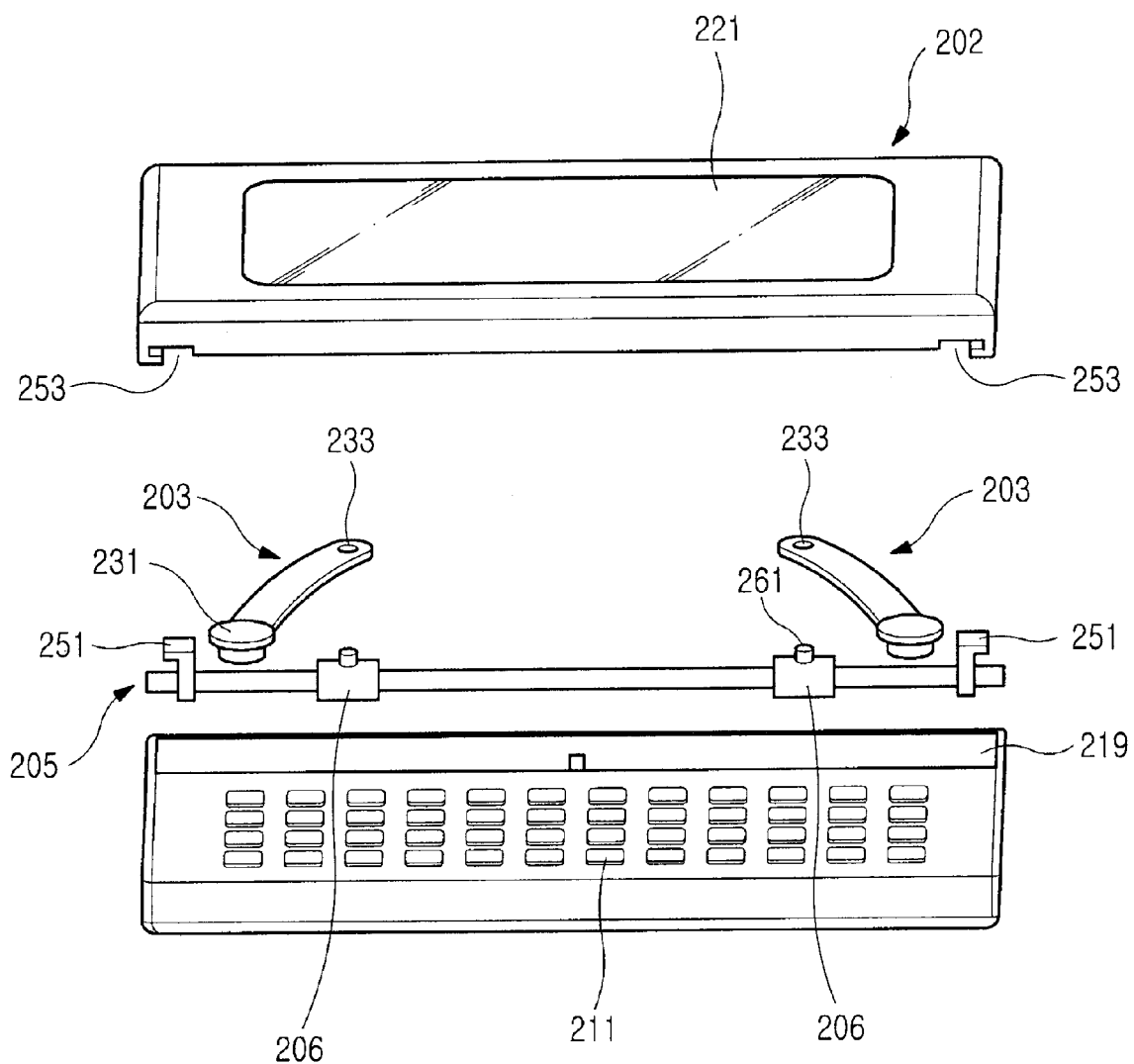
FIG. 8 is an exploded perspective view illustrating a sliding-type portable terminal according to an exemplary embodiment of the present invention.

FIG. 8 is an exploded perspective view illustrating a sliding-type portable terminal 200 according to another exemplary embodiment of the present invention. As shown in FIG. 8, the sliding-type portable terminal 200 according to another exemplary embodiment of the present invention is similar to the previous embodiment in that a first housing 201 and a second housing 202 are connected by means of link members 203 so that the second housing 202 slides in a predetermined direction on the first housing 201. However, there is a difference in that, by further mounting a guide pole 205, the second housing 202 can pivot when a keypad 211 mounted on the first housing 201 is opened.

By rotating in a state of the keypad 211 being opened, the second housing 202 can be inclined with respect to the first housing 201. Therefore, if a display device 221 is mounted on the second housing 202, the user can easily place the display device 211 in user's sight so that the user can conveniently use the multimedia function, such as watching broadcasting, or the like.

Referring to FIG. 8, the keypad 211 is mounted on or otherwise integrated with one surface of the first housing 201. A first guide opening 219 is formed on a side of the first housing 201, particularly, an upper surface of the first housing 201. The first guide opening 219 extends in a vertical direction with respect to a direction of the movement of the second housing 202. The guide pole 205 is fixed and mounted within the first guide opening 219, and at this time, both ends of the guide pole 205 are fixed on inner walls of both ends of the first guide opening 219, respectively. A section of the guide pole 205 is shaped like a circle, and the guide pole 205 serves a means for connecting the first housing 201 to the link members 203.

The display device 221 is mounted on the second housing 202, and the second housing 201 rotates relative to the first housing 201 in a state in which the keypad 211 is opened. Accordingly, the display device 211 is inclined with respect to the first housing 201.

One end 231 of each of the link members 203 is rotatably assembled on the second housing 202, respectively, and the other end thereof is mounted to be movable along the guide pole 205. The structure of the link members 203 and the second housing 202 can be easily implemented by those skilled in the art through reference to the structure of the link members 103 and the first housing 101 described in the previous exemplary embodiment. Therefore, a more detailed description of the structure of the link members 203 and the second housing 202 will be omitted.

The other end of each of the link members 203 is mounted to be movable along the guide pole 205, respectively. In order to connect each of the link members 203 to the guide pole 205, an engagement member 206 is mounted on the guide pole 205 for each of the link members 203. The engagement member 206 encloses an outer surface of the guide pole 205 so that the engagement member 206 can rotate along a circumference of the guide pole 205 and at the same time linearly move along a longitudinal direction of the guide pole 205. An engaging protrusion 261 is formed on an outer surface of the engagement member 206 so as to be engaged with an engaging opening 233 formed on the other end of the link member 203. Therefore, the link members 203 are rotatably assembled with the engagement member 206, respectively, and can move in the longitudinal direction of the guide pole 205 according to movement of the engagement member 206.

In addition, a guide member 251 is formed on the both ends of the guide pole 205, respectively, so as to support the sliding of the second housing 202. The guide member 251 can rotate on the guide pole 250 similar to the engagement member 206. An end of the guide member 251 protrudes from the one surface of the first housing 201 and is bent relative to the first housing 201.

A second guide groove 253 extending in the sliding direction of the second housing 202 is formed on one surface of the second housing 202. The end of the guide member 251 is received in the second guide groove 253 and linearly moves in the second guide groove 253 when the second housing 202 slides. That is, the guide member 251 guides the sliding of the second housing together with the second guide groove 253. At this time, the guide member 251 can linearly move on the guide pole 205. However, the end of the guide member 251 is received in the second guide groove 253 extending in the movement direction of the second housing 202 so as to maintain its stopped state.

Figure 9:
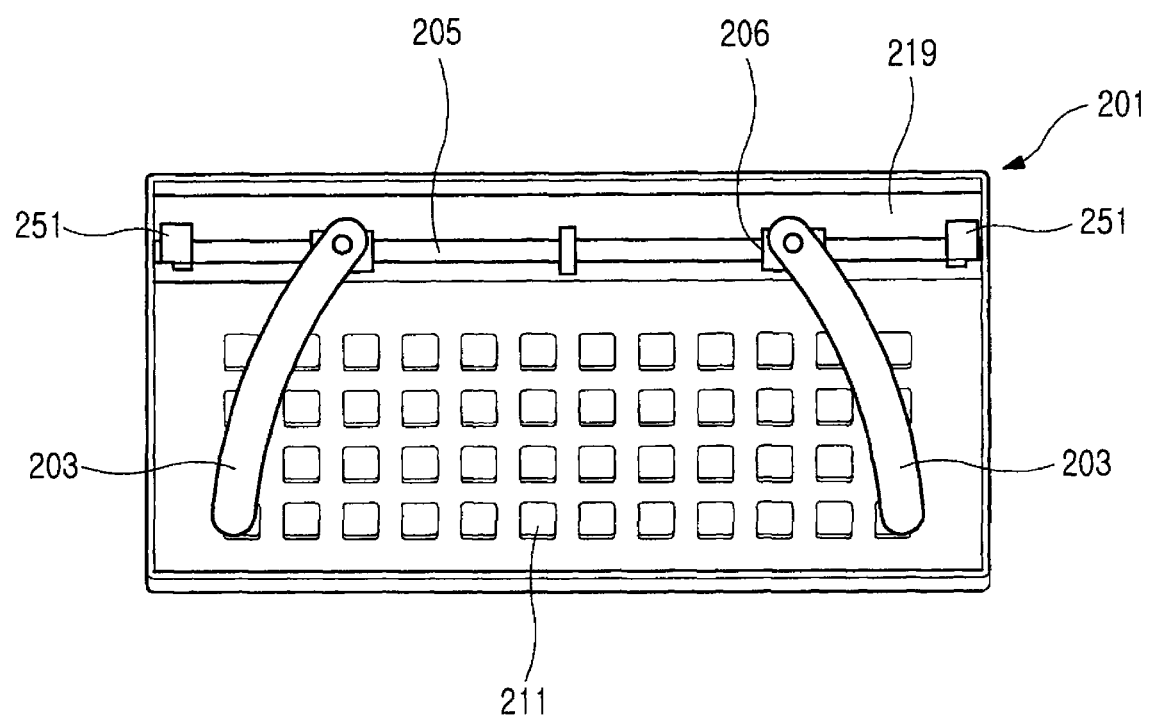
FIGS. 9, 10 and 11 are virtual views sequentially illustrating the opening of a first housing of a sliding-type portable terminal according to an exemplary embodiment of the present invention.

Referring to FIG. 9, when the keypad 211 is completely closed, the ends of the link members 203 are adjacent to a lower portion of the second housing 202, and the other ends thereof are adjacent to an upper portion of the first housing 201. At this time, the second housing 202 can only slide on the first housing 201, and cannot rotate. The guide pole 205 is a center of the rotation of the second housing 202. However, when the keypad 211 is closed, the upper portion and the lower portion of the second housing 202 are engaged with the first housing 201 so that the second housing 202 cannot rotate.

Figure 10:
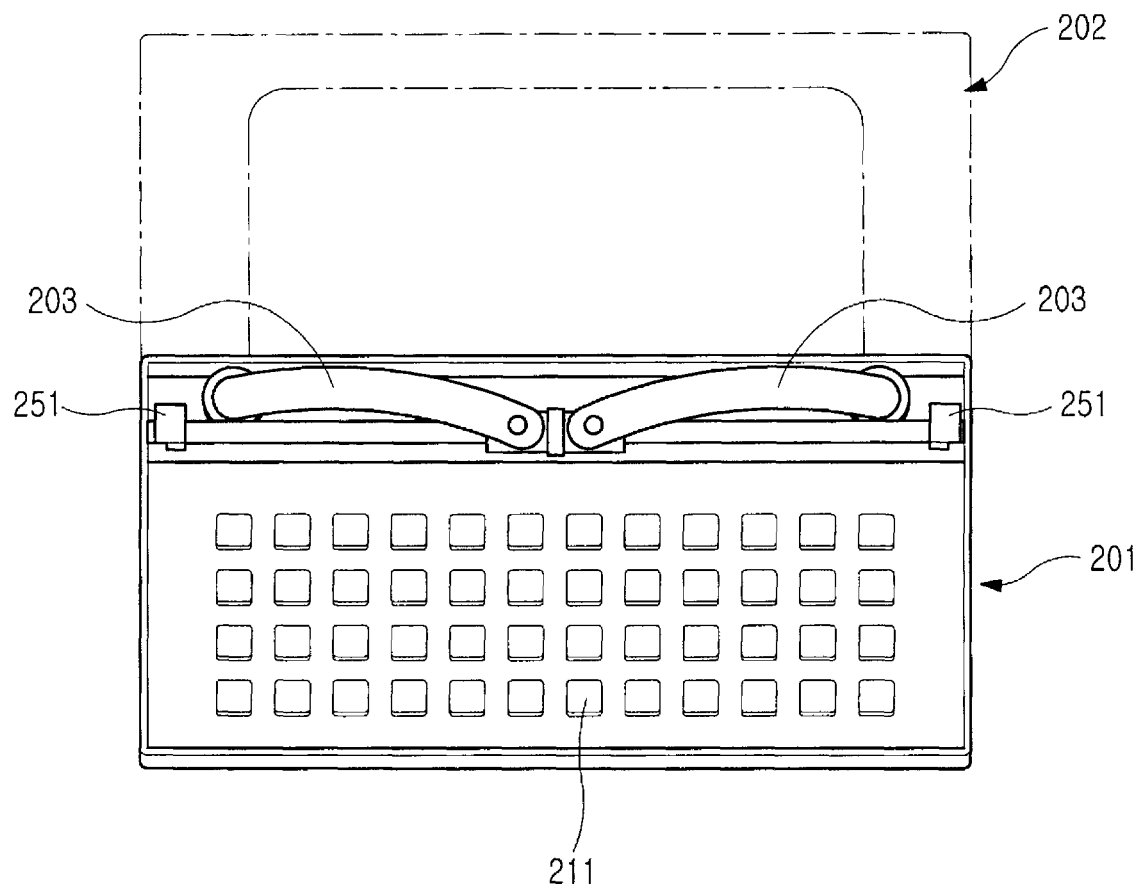
Figure 12:
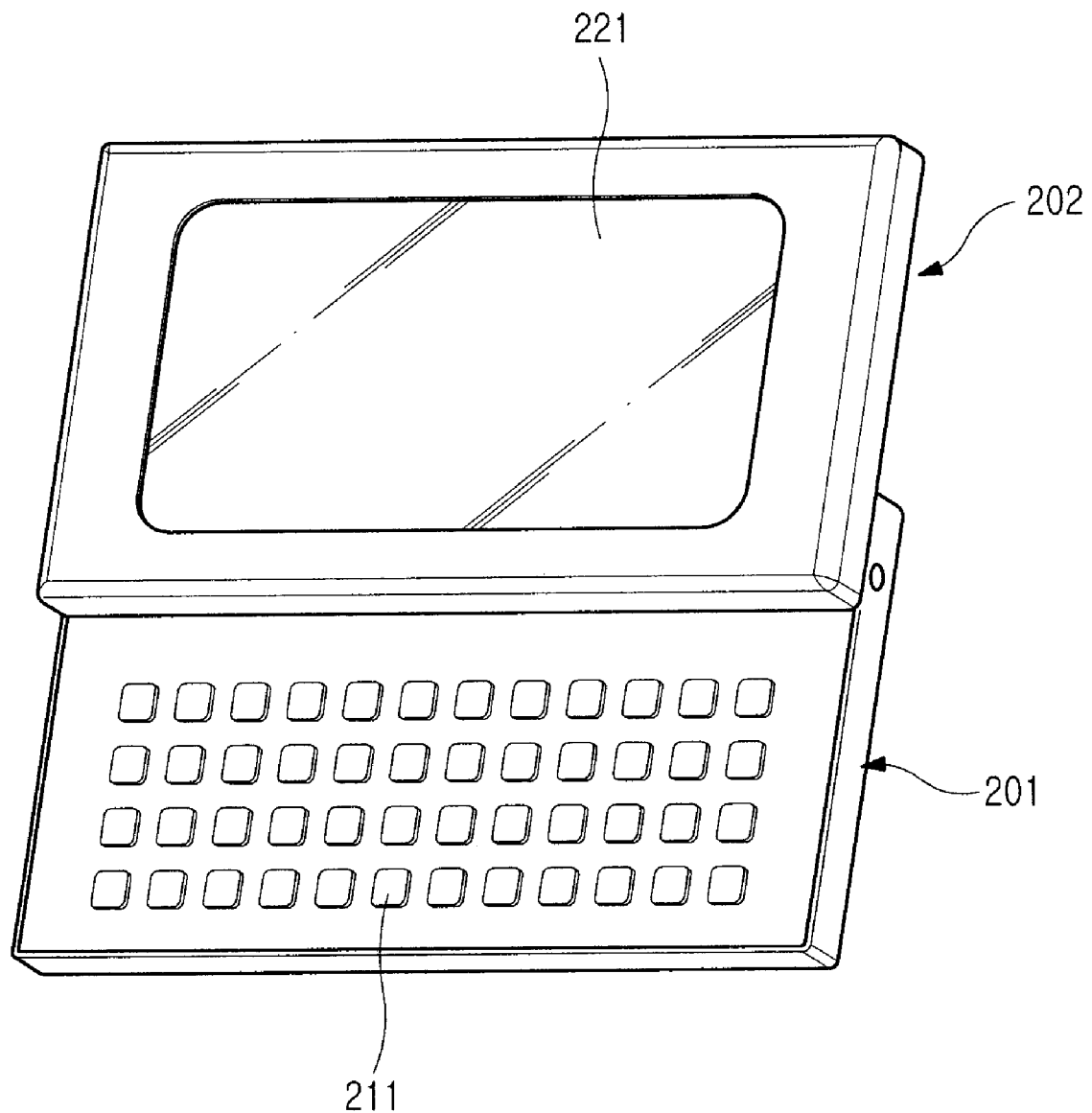
FIG. 12 is a perspective view illustrating an opened state of a part of a first housing of a sliding-type portable terminal according to an exemplary embodiment of the present invention.

Referring to FIGS. 10 and 12, if the second housing 202 upwardly slides so as to completely open the keypad 211, the user uses the terminal 200 as an information device or a communication device having a function of writing a general text message, e-mail, or the like. The guide member 251 slides while being confined in the second guide groove 253 during the sliding of the second housing 202, thereby supporting the sliding of the second housing 202.

In the meantime, as shown in FIGS. 10 and 12, even though the keypad 211 is completely opened, the first guide opening 219 maintains its closed state. That is, the keypad 211 is mounted on a part of the one surface of the first housing 201 so as to be opened/closed by the second housing 202, and the first guide opening 219 is formed on the other part thereof so that the first guide opening 219 maintains its closed state by the second housing 202, regardless of the sliding of the second housing 202.

If the second housing 202 slides to a top side of the first housing 201, the ends of the link members 203 are adjacent to a top edge of the first housing 201, and the other ends of the link members 203 approach each other.

Figure 11:
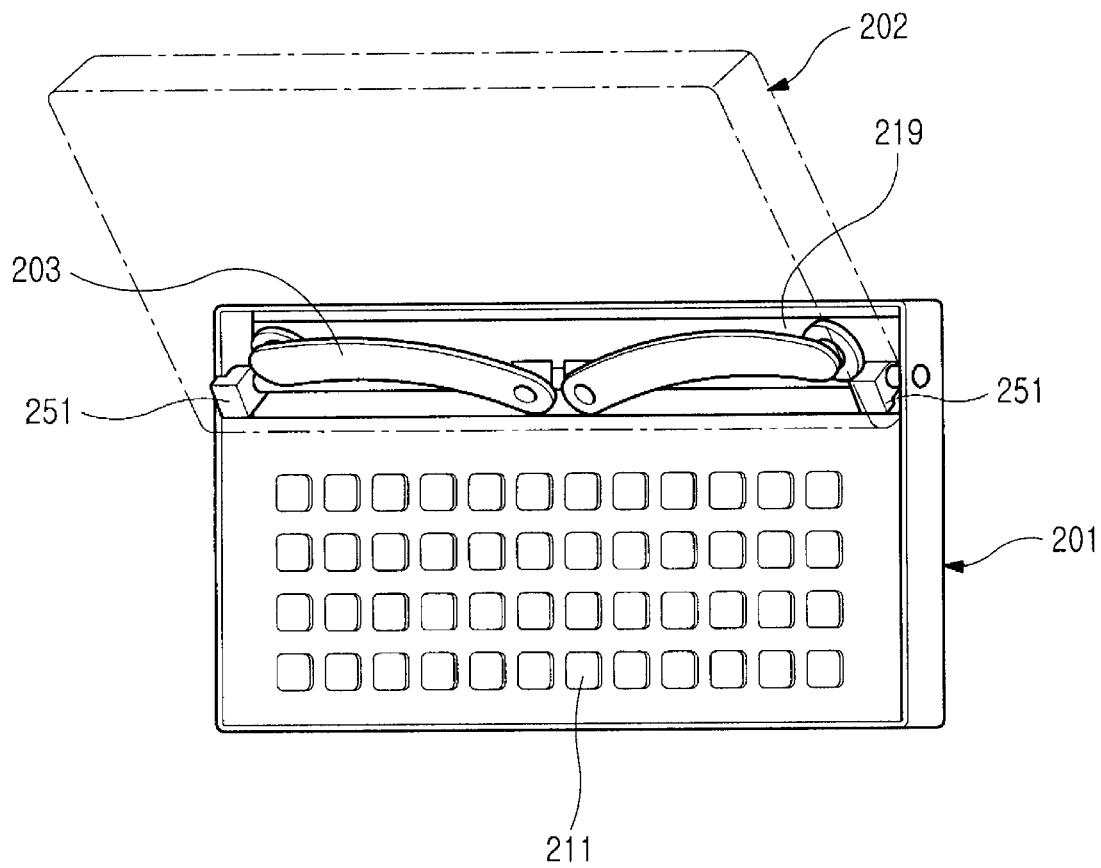
Figure 13:
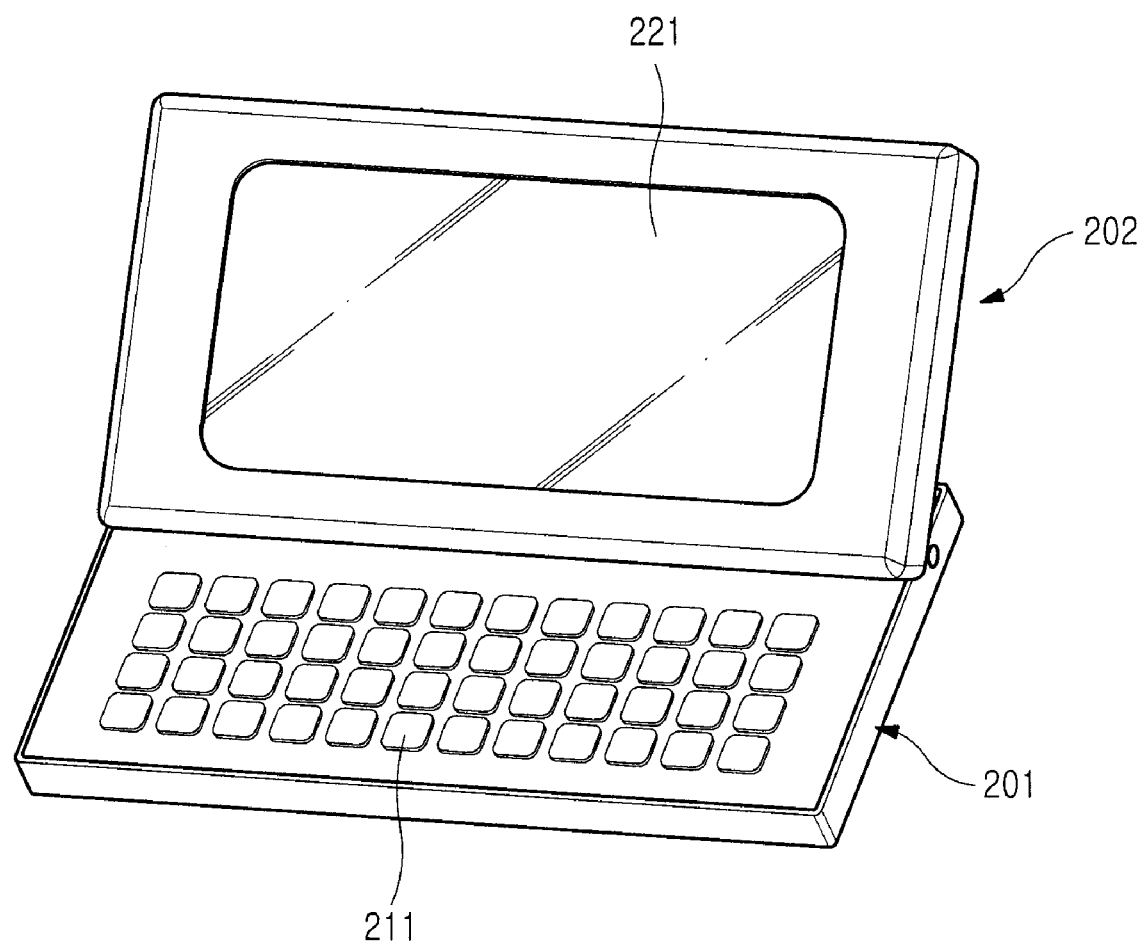
FIG. 13 is a perspective view illustrating a rotation of a second housing of a sliding-type portable terminal according to an exemplary embodiment of the present invention.

FIGS. 11 and 13 illustrate that the second housing 202 may rotate about the guide pole 205 when the keypad 211 is completely opened. If the keypad 211 is completely opened, a lower end of the second housing 202 is positioned adjacent to the guide pole 205 so that the second housing 202 is not engaged by the first housing 201 and therefore can smoothly rotate. At this time, if an edge of the lower end of the second housing 202 is formed to be a curved surface or a groove in which the edge of the lower end can move during rotating the second housing 202 is formed to be adjacent to the first guide opening 219, the second housing 202 can more smoothly rotate while the edge of the lower end thereof is not engaged by the first housing 201.

As shown in FIGS. 11 and 13, if the second housing 202 rotates so as to be inclined with respect to the first housing 201, the user can conveniently enjoy multimedia service, such as watching a broadcast, or the like, through the terminal 200. That is, unlike the function of the voice call, the multimedia service including watching of the broadcast is used for long hours without operating the terminal. At this time, if the user places the first housing 201 on a plane surface such as a desk, the user can comfortably enjoy multimedia service while the display device 211 is placed in user's sight, even though the user does not hold the device.

As described above, in a sliding-type portable terminal according to an exemplary embodiment of the present invention, the pair of housings is slidably assembled by means of the link member so that the sliding range can be sufficiently secured. Therefore, the space for mounting the input device, such as the keypad, or the like, can be expanded and the assembling structure between the housings can be firmly maintained. Further, if the guide protrusion and the guide groove are formed between the housings, the sliding can be more stably implemented. Furthermore, if the driving force for rotating the link member is supplied by means of the cam member and the spring, the driving force for moving the housings is provided so that it is convenient to open/close the portable terminal.

Moreover, by using the guide pole and the engagement member upon mounting the link member, one housing can rotate in a direction of being inclined with respect to the other housing in a state of the other housing being opened, so that the user can conveniently enjoy the multimedia service, or the like.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A sliding-type portable terminal comprising:
a first housing;
a second housing for sliding while facing the first housing;

one end of each of a pair of link members coupled with one of the first housing and the second housing so as to rotate; and a first guide opening formed on the other of the first housing and the second housing and engaged with an other end of each of the pair of link members, wherein the other end of each of the pair of link members is engaged with the first guide opening so as to move along the first guide opening as the second housing slides, and wherein, as the second housing slides, the other end of each of the pair of link members moves in a direction towards or away from each other.

2. The sliding-type portable terminal as claimed in claim 1, wherein the pair of link members is coupled with the first housing so as to rotate on one surface of the first housing, and the first guide opening is formed on one surface of the second housing.

3. The sliding-type portable terminal as claimed in claim 2, further comprising a pair of engagement members, each having a supporting part positioned on an inside of the second housing and a connecting part extending from the supporting part to the first guide opening, wherein the connecting part of each engagement member is coupled with the one end of each of the pair of link members, respectively, so that the one end of each of the pair of link members is engaged with the first guide opening by means of the engagement member, respectively.

4. The sliding-type portable terminal as claimed in claim 2, further comprising:
a first guide protrusion formed on one of the first housing and the second housing; and
a first guide groove formed on the one of the first housing and the second housing on which the guide protrusion is not formed, the guide groove extending in a direction of the movement of the second housing,
wherein the guide protrusion and the guide groove are engaged with each other so as to support the sliding of the second housing.

5. The sliding-type portable terminal as claimed in claim 4, further comprising a second guide protrusion and a second guide groove formed on one of the first housing and the second housing, respectively.

6. The sliding-type portable terminal as claimed in claim 4, wherein the first guide protrusion is blocked by an inner wall of one end of the first guide groove when the second housing completely closes the one surface of the first housing, and the ends of the link members are blocked by each other when the second housing opens a part of the one surface of the first housing, so that a movement range of the second housing is limited.

7. The sliding-type portable terminal as claimed in claim 2, further comprising:
a pair of pivot pins respectively extending from another end of each of the pair of link members to an inside of the first housing; and
a pair of fastening members respectively engaged with an end of the pivot pins in the inside of the first housing,
wherein the link members rotate about the pivot pin, respectively.

8. The sliding-type portable terminal as claimed in claim 7, further comprising a pair of bushings respectively coupled with each of the pair of pivot pins and interposed between the respective fastening member and an inner surface of the first housing.

9. The sliding-type portable terminal as claimed in claim 7, further comprising:

a first cam member coupled with one of the pivot pins and interposed between the fastening member and the inner surface of the first housing; and a second cam member mounted in the inside of the first housing so as to apply pressure to an outer surface of the first cam member, wherein a friction force is generated between the first cam member and the second cam member while the link members rotate.

10. The sliding-type portable terminal as claimed in claim 9, further comprising:
a spring housing mounted on the inner surface of the first housing; and
a spring received in the spring housing,
wherein the second cam member receives an elastic force of the spring so as to apply the pressure to the outer surface of the first cam member.

11. The sliding-type portable terminal as claimed in claim 10, further comprising:
a support rib formed on the inner surface of the first housing, the support rib enclosing the spring housing; and
a cover coupled with the support rib, the cover facing one surface of the spring housing.

12. The sliding-type portable terminal as claimed in claim 9, further comprising a pair of stopper grooves formed on the outer surface of the first cam member, wherein the second cam member is engaged with any one of the stopper grooves at a position where the second housing completely closes the first housing and where a part of the first housing is opened.

13. The sliding-type portable terminal as claimed in claim 12, wherein, when the second cam member faces one of the stopper grooves and applies pressure to the outer surface of the first cam member, the first cam member rotates in a direction in which the second cam member is engaged with any one of the stopper grooves.

14. The sliding-type portable terminal as claimed in claim 2, further comprising a keypad mounted on the one surface of the first housing, wherein the keypad is opened/closed as the second housing slides.

15. The sliding-type portable terminal as claimed in claim 2, wherein the first guide opening and the ends of the pair of link members are adjacent to one side surface of the first housing when the first housing is completely closed, and the first guide opening and the ends of the pair of link members are adjacent to another side surface of the first housing when the one surface of the first housing is at least partially opened.

16. The sliding-type portable terminal as claimed in claim 1, wherein the another ends of the pair of link members are coupled with the second housing so as to rotate on the one surface of the second housing, and the first guide opening is formed on the one surface of the first housing.

17. The sliding-type portable terminal as claimed in claim 16, further comprising:
a guide pole mounted in the first guide opening; and
a pair of engagement members, each engagement member being around an outer surface of the guide pole so as to rotate around the guide pole and so as to slide along the guide pole,
wherein the end of each of the pair of link members is rotatably coupled with one of the engagement members, respectively.

18. The sliding-type portable terminal as claimed in claim 17, wherein, when the second housing opens a part of the one surface of the first housing, the link members and the second housing rotate about the guide pole as the engagement members rotate about the guide pole.

19. The sliding-type portable terminal as claimed in claim 17, further comprising:
- a guide member around the outer surface of the guide pole so as to rotate around the guide pole, wherein an end of the guide member protrudes from the one surface of the first housing; and
- a guide groove formed on the one surface of the second housing, the guide groove extending along the movement direction of the second housing,
- wherein the guide member supports the sliding of the second housing while moving in the guide groove.

20. The sliding-type portable terminal as claimed in claim 19, wherein, when the second housing opens a part of the one surface of the first housing, the link members and the second housing rotate about the guide pole as the engagement members and the guide member rotate about the guide pole.

21. The sliding-type portable terminal as claimed in claim 20, wherein the second housing is positioned to be inclined with respect to the first housing as the second housing rotates about the guide pole.

22. The sliding-type portable terminal as claimed in claim 21, wherein a display device is mounted on the second housing, and a keypad is mounted on the part of the one surface of the first housing opened/closed by the second housing.

23. The sliding-type portable terminal as claimed in claim 22, wherein the first guide opening is formed on another part of the one surface of the first housing, and the first guide opening always maintains a closed state by the second housing, even though the second housing slides.

* * * * *